United States Patent
Bai et al.

(10) Patent No.: US 11,345,841 B1
(45) Date of Patent: May 31, 2022

(54) FIBER SILICA COMPOSITE MICROSPHERE FOR SHALE STRATUM, DRILLING FLUID AND PREPARATION METHOD AND USE THEREOF

(71) Applicant: Southwest Petroleum University, Chengdu (CN)

(72) Inventors: Yang Bai, Chengdu (CN); Lingfeng Wu, Chengdu (CN); Pingya Luo, Chengdu (CN); Wenzhe Li, Chengdu (CN); Feng Dai, Chengdu (CN); Gang Xie, Chengdu (CN); Haibo Liang, Chengdu (CN); Kesheng Rong, Chengdu (CN); Jiading Deng, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/505,362

(22) Filed: Oct. 19, 2021

(30) Foreign Application Priority Data

Feb. 22, 2021  (CN) .......................... 202110199460.1

(51) Int. Cl.
*C09K 8/32* (2006.01)
*C09K 8/03* (2006.01)
*C09K 8/05* (2006.01)
*C09K 8/26* (2006.01)

(52) U.S. Cl.
CPC ................ *C09K 8/032* (2013.01); *C09K 8/05* (2013.01); *C09K 8/265* (2013.01); *C09K 2208/08* (2013.01); *C09K 2208/14* (2013.01)

(58) Field of Classification Search
CPC .......... C09K 8/032; C09K 8/05; C09K 8/265; C09K 2208/08; C09K 2208/14
See application file for complete search history.

(56) References Cited

U.S. PATENT DOCUMENTS

| | | | | |
|---|---|---|---|---|
| 5,212,143 | A | * | 5/1993 | Torobin ................ C03B 37/022 435/395 |
| 2012/0111231 | A1 | * | 5/2012 | Sueyoshi .............. C09C 1/3063 524/556 |

FOREIGN PATENT DOCUMENTS

CN 108767220 A * 11/2018 ........ H01M 10/0525

* cited by examiner

*Primary Examiner* — Kumar R Bhushan
(74) *Attorney, Agent, or Firm* — Calfee Halter & Griswold LLP

(57) ABSTRACT

A fiber silica composite microsphere for a shale stratum comprises a hollow silica sphere and fibers, and the fibers are partially coated on an outer surface of the hollow silica sphere and partially embedded into an interior of the hollow silica sphere. The hollow silica sphere has an outer diameter of 1-5 μm and an inner diameter of 0.8-4.7 μm; the fibers have a length of 5-10 μm and a width of 1-3 μm.

9 Claims, No Drawings

FIBER SILICA COMPOSITE MICROSPHERE FOR SHALE STRATUM, DRILLING FLUID AND PREPARATION METHOD AND USE THEREOF

PRIORITY CLAIM & CROSS REFERENCE

The application claims priority to Chinese Application No. 202110199460.1, filed on Feb. 22, 2021, entitled "Fiber silica composite microspheres for shale stratum, drilling fluid and preparation method and use thereof", which is herein specifically and entirely incorporated by reference.

FIELD

The present application relates to the technical field of drilling fluid, and in particular to a fiber silica composite microsphere for a shale stratum, a drilling fluid and a preparation method and an application thereof.

BACKGROUND

The key of shale gas well drilling is to solve the problem of stabilizing the borehole of a shale well section, wherein the core problem is how to reduce the collapse pressure, and use the low-density drilling fluid for ensuring the borehole wall stability, the borehole regularity and the downhole safety. The primary work of drilling the shale gas well comprises determining the collapse pressure of the shale well section, and the evaluation method of an influence of the water-based drilling fluid on an increase of the collapse pressure, wherein the influence comprises an impact of the hydration on the borehole stability and the collapse pressure; in addition, it is required to select a reasonable drilling fluid density, strengthen the plugging and inhibiting effects, correctly select the type of the water-based drilling fluid, and finally ensure the borehole wall stability, the borehole regularity and the downhole safety by means of the low-density drilling fluid.

In regard to the specificity of the shale stratum, such as weak expansion and strong dispersion, the development of micro-cracks (micro-fractures) and micropores, low porosity and low permeability, prominent capillary effect, and outburst of falling and collapse of blocks, the technical problem to be first solved is how to block the micro-cracks, so as to prevent the liquid in the borehole from entering into the stratum through the micro-cracks.

Therefore, the research and development of the drilling fluid are of great significance.

SUMMARY

The present disclosure aims to overcome the problems regarding poor effect of plugging micro-cracks of the shale stratum and the defects that the liquid in the borehole can easily enter into the stratum through the micro-cracks in the prior art, and provides a fiber silica composite microsphere for a shale stratum, a drilling fluid and a preparation method and a use thereof.

In order to achieve the above objects, a first aspect of the present disclosure provides a fiber silica composite microsphere for a shale stratum, wherein the fiber silica composite microsphere comprises a hollow silica sphere and fibers, and the fibers are partially coated on an outer surface of the hollow silica sphere and partially embedded into an interior of the hollow silica sphere, wherein the hollow silica sphere has an inner diameter of 0.8-4.7 µm and an outer diameter of 1-5 µm; the fibers have a length of 5-10 µm and a width of 1-3 µm.

A second aspect of the present disclosure provides a method for preparing the fiber silica composite microspheres for a shale stratum of claim 1, wherein the method comprises the following steps:

(1) subjecting fibers and an oil/water double emulsion to a first contact to obtain a first mixture;

(2) subjecting the first mixture and a silicon source to a second contact and the subsequent standing still to obtain a second mixture;

(3) subjecting the second mixture to a reduced pressure suction filtration and a drying treatment to obtain the fiber silica composite microsphere for a shale stratum.

A third aspect of the present disclosure provides a drilling fluid for a shale stratum, wherein the drilling fluid for a shale stratum comprises the aforementioned fiber silica composite microsphere for a shale stratum.

A fourth aspect of the present disclosure provides a method for preparing the drilling fluid for a shale stratum, wherein the method comprises the following steps:

(S1) contacting water with bentonite, sulfonated phenolic resin, sulfonated lignite and a weighting agent sequentially under the stirring condition to obtain a sulfonated drilling fluid system;

(S2) contacting the sulfonated drilling fluid system with the aforementioned fiber silica composite microsphere to obtain a drilling fluid for a shale stratum.

A fifth aspect of the present disclosure provides a use of the aforementioned drilling fluid for a shale stratum in the well-drilling construction operation for the micro-crack development shale stratum.

Through the technical scheme, the technical solution of the present disclosure has the following favorable effects:

The present disclosure can successfully perform an effective plugging of the micro-cracks on the shale borehole wall by means of the fiber silica composite microsphere for a shale stratum, and adding the fiber silica composite microspheres into a sulfonated drilling fluid system.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a fiber silica composite microsphere for a shale stratum, wherein the fiber silica composite microsphere comprises a hollow silica sphere and fibers, and the fibers are partially coated on an outer surface of the hollow silica sphere and partially embedded into an interior of the hollow silica sphere, wherein the hollow silica sphere has an inner diameter of 0.8-4.7 µm and an outer diameter of 1-5 µm; the fibers have a length of 5-10 µm and a width of 1-3 µm.

The inventors of the present disclosure have found that the micro-cracks in the shale can be plugged by taking advantage of the characteristics of the hollow silica spheres, such as low density, small size and high hardness; in addition, during the preparation process of the fiber silica composite microspheres, the fibers are partially coated on the outer surface of the hollow silica spheres and partially embedded into an interior of the hollow silica spheres, such that the hollow silica sphere and the fibers produce an overlapping effect. After the hollow silica spheres enter into the micro-cracks of the shale, the fibers are intertwined, so that a plurality of hollow silica spheres are aggregated, and the fibers and the inner walls of the micro-cracks have large friction force, thus the hollow silica spheres can be stably disposed in the micro-cracks of the shale, so as to perform the functions of plugging and stabilizing the borehole wall.

According to the present disclosure, it is preferable that the hollow silica sphere has an inner diameter of 2.8-4.5 μm and an outer diameter of 3-5 μm; more preferably, the hollow silica sphere has an inner diameter of 3-4 μm and an outer diameter of 3.4-4.9 μm; further preferably, the hollow silica sphere has an inner diameter of 4 μm and an outer diameter of 4.5-4.9 μm; the fibers have a length of 5-8 μm and a width of 1-2 μm. In the present disclosure, the inner diameter and the outer diameter of the hollow silica sphere and the length and the width of the fiber are defined within the aforesaid ranges, the outer diameter of the hollow silica sphere is matched with the size of the shale micro-cracks, so that the hollow silica sphere can enter the micro-cracks for filling and stacking; moreover, the length and the width of the fibers are within the defined ranges, the desirable dispersibility can be ensured in the reaction process, the fibers can be favorably coated on an outer surface of the hollow silica sphere and embedded into an interior of the hollow silica sphere, such that the micro-cracks on the shale borehole wall can be desirably blocked; in addition, the aspect ratio (i.e., the ratio of length and width) of the fibers should not be too large, an excessively large ratio of length and width tends to cause the fibers to intertwine in the drilling fluid, thereby resulting in poor dispersibility.

According to the present disclosure, it is preferable that the fibers coated on the outer surface of the hollow silica sphere are distributed in a strip shape, the advantages are that the fibers have better dispersibility, so as to prevent the fibers from aggregation and enlargement in the drilling fluid and formation of the floccules.

According to the present disclosure, the fibers are one or more selected from the group consisting of polyester fibers, polyesteramine fibers, polypropylene fibers, and polytetrafluoroethylene fibers.

According to the present disclosure, the hollow silica sphere is contained in an amount of 62-83 wt %, and the fibers are contained in an amount of 17-38 wt %, based on the total weight of the fiber silica composite microsphere; preferably, the hollow silica sphere is contained in an amount of 67-78 wt %, and the fibers are contained in an amount of 22-33 wt %, based on the total weight of the fiber silica composite microsphere; more preferably, the hollow silica sphere is contained in an amount of 67-71 wt %, and the fibers are contained in an amount of 29-33 wt %, based on the total weight of the fiber silica composite microsphere.

According to the present disclosure, the content of the fibers embedded into an interior of the hollow silica sphere is 4-16 wt %, preferably 7-13 wt %, and more preferably 10-13 wt %, based on the total weight of the fibers.

In the present disclosure, the fibers and the hollow silica sphere are effectively combined together, the fibers are partially coated on an outer surface of the hollow silica sphere and partially embedded into an interior of the hollow silica sphere, the synergy of the fibers and the hollow silica sphere can significantly improve the plugging property and the borehole wall stability performance; in regard to the fibers, on one hand, the fibers have characteristics of being soft and prone to deform, the fibers can be used for connecting and gathering a plurality of hollow silica spheres together; on the other hand, the fiber silica composite microsphere can be stably resided in the micro-cracks of the shale by taking advantage of the characteristic of large frictional resistance between the fibers and the micro-crack wall; in regard to the hollow silica spheres, on one hand, the hollow silica spheres have high hardness and are not prone to deform in micro-cracks, so that the stability of the borehole wall can be remarkably improved; on the other hand, the hollow silica spheres have a hollow structure and small density, adding a large amount of the hollow silica spheres will not substantially influence the density of the drilling fluid.

A second aspect of the present disclosure provides a method for preparing the fiber silica composite microspheres for a shale stratum of claim 1, wherein the method comprises the following steps:

(1) subjecting fibers and an oil/water double emulsion to a first contact to obtain a first mixture;

(2) subjecting the first mixture and a silicon source to a second contact and the subsequent standing still to obtain a second mixture;

(3) subjecting the second mixture to a reduced pressure suction filtration and a drying treatment to obtain the fiber silica composite microsphere for a shale stratum.

According to the present disclosure, the conditions of the first contact in step (1) include: a stirring speed within a range of 400-700 rpm, a temperature of 20-30° C. and a time of 4-9 min; preferably, a stirring speed within a range of 500-600 rpm, a temperature of 23-28° C. and a time of 5-8 min.

According to the present disclosure, the oil/water double emulsion comprises an oil phase and a water phase, wherein the oil phase is a mixture of span 80 and n-pentane, and the water phase is a mixture of tween 20 and an aqueous hydrochloric acid solution; wherein the concentration of the aqueous hydrochloric acid solution is 4-8 mol/L, preferably 5-7 mol/L; it is preferable that the volume ratio of the oil phase to the water phase is 3:(1.5-2.5), more preferably 3:2. Specifically, during a process of preparing the oil/water double emulsion, 5 g of span 80 is firstly dissolved in 60 mL of n-pentane, the solution is used as an oil phase of the oil/water double emulsion, 4 g of tween 20 is then dissolved in 40 mL of aqueous hydrochloric acid solution having a concentration of 6 mol/L, the solution is used as a water phase of the oil/water double emulsion, the oil phase and the water phase are subsequently mixed with each other to prepare the oil/water double emulsion.

According to the present disclosure, the span is used in an amount of 5-12 g relative to 100 mL of the n-pentane; the tween 20 is used in an amount of 6-14 g relative to 100 mL of the aqueous hydrochloric acid solution; preferably, the span is used in an amount of 7-10 g relative to 100 mL of the n-pentane; the tween 20 is used in an amount of 8-12 g relative to 100 mL of the aqueous hydrochloric acid solution.

According to the present disclosure, the fibers are used in an amount of 30-70 g, preferably 40-60 g, based on the total weight of 100 mL of the n-pentane and 100 mL of the aqueous hydrochloric acid solution.

According to the present disclosure, the conditions of the second contact in step (2) include: a stirring speed within a range of 400-700 rpm, a temperature of 20-30° C., and a time of 25-55 min; preferably, the stirring rate is 500-600 rpm, the temperature is 24-27° C., and the time is 30-50 min.

According to the present disclosure, the condition of the standing still includes: a time of 1.5-4.5 h, preferably 2-4 h.

According to the present disclosure, the silicon source is one or more selected from the group consisting of methyl orthosilicate, ethyl orthosilicate and tetraethyl orthosilicat, preferably methyl orthosilicate.

According to the present disclosure, the mass ratio of the used amount of the silicon source relative to the fibers is 1:(3-7), preferably 1:(4-6).

According to the present disclosure, a Buchner funnel is adopted in the step (3) to carry out reduced pressure suction filtration on the second mixture after standing still, in order to obtain a solid; the obtained solid is washed with ethanol and the washed solid is then placed in a baking oven to carry out drying treatment to obtain the fiber silica composite microspheres.

In the present disclosure, the conditions of the reduced pressure suction filtration include: the pressure is within a range of −0.1 MPa to −0.05 MPa.

In the present disclosure, the drying conditions include: a temperature of 40-50° C., and a time of 3-5 h.

In the present disclosure, the obtained solid product is washed with ethanol for 3-5 times.

A third aspect of the present disclosure provides a drilling fluid for a shale stratum, wherein the drilling fluid for a shale stratum comprises the aforementioned fiber silica composite microspheres for a shale stratum.

According to the present disclosure, the fiber silica composite microsphere is contained in an amount of 3-15 parts by weight, preferably 5-10 parts by weight, relative to 100 parts by weight of the sulfonated drilling fluid.

Preferably, the sulfonated drilling fluid further comprises water, bentonite, sulfonated phenolic resin, sulfonated lignite and a weighting agent, and the content of the bentonite is 3-6 parts by weight, the content of the sulfonated phenolic resin is 8-12 parts by weight, the content of the sulfonated lignite is 8-12 parts by weight, and the content of the weighting agent is 30-40 parts by weight, based on 100 parts by weight of water.

According to the present disclosure, the weighting agent is one or more selected from the group consisting of barite, magnetite powder and ilmenite powder, preferably barite. In the present disclosure, the barite is purchased from the Lingshou County Ruixin Mineral Powder Factory, the model is barite powder special for oil fields, the barite powder is also called barium sulfate powder, the chemical composition is $BaSO_4$, the crystal belongs to sulfate mineral of an orthogonal (orthorhombic) crystal system. Usually, the crystals are generally in the shape of thick plates or columnar crystals, and are usually dense aggregates consisting of block-like crystals or plate-like crystals or granular crystals. The pure barite is colorless and transparent, and the color is dyed into various colors when the barite contains impurities, such as the streak is white with the glossiness of glass, it is transparent or semitransparent. The barite has 3 directions of perfect and medium cleavage, a mohs hardness of 3-3.5, a specific gravity of 4.5. The addition of said weighting agent can improve the hydrostatic column pressure of the drilling fluid, achieve the effects of balancing the collapse stress of the stratum and stabilizing the borehole wall, in addition, it can balance the fluid pressure of the stratum in a high-pressure well, and avoid an occurrence of accidents such as well kick and blowout.

According to the present disclosure, the sulfonated lignite is purchased from Puyang Hongda Chemical Manufacturing Co., Ltd., with a model of SMC; the sulfonated lignite (SMC) is a derivative of humic acid of lignite, it is prepared by synthesizing lignite with the sulfonating agent under the conditions such as an appropriate temperature, has the external property of brownish black powder, thus it is a viscosity reducer and a filtration loss control agent of fresh water drilling fluid capable of resisting high temperature of 200-220° C., and a cheap and efficient slurry treatment agent.

According to the present disclosure, the sulfonated phenolic resin is purchased from Hebei Yanxing Chemical Co., Ltd., with a model of SMP-II; the sulfonated phenolic resin (SMP-II) is a polycondensate of phenol, formaldehyde and sulfite, it is polyanionic water-soluble polyelectrolyte, a brown powder, it is easily soluble in water, its aqeuous solution has a weak alkalinity, thus the sulfonated phenolic resin is a high-temperature resistant and salt-resistant drilling fluid filtrate reducer.

A fourth aspect of the present disclosure provides a method for preparing the drilling fluid for a shale stratum, wherein the method comprises the following steps:

(S1) contacting water with bentonite, sulfonated phenolic resin, sulfonated lignite and a weighting agent sequentially under the stirring condition to obtain a sulfonated drilling fluid system;

(S2) contacting the sulfonated drilling fluid system with the aforementioned fiber silica composite microsphere to obtain a drilling fluid for a shale stratum.

According to the present disclosure, the conditions of the stirring in the step (S1) include: a stirring speed within a range of 1,000-1,200 rpm, and a stirring time of 120-180 min.

The fifth aspect of the present disclosure provides a use of the aforementioned drilling fluid for a shale stratum in the well-drilling construction operation for the micro-crack development shale stratum.

According to the present disclosure, the types of the micro-crack development shale stratum are mainly the high-angle oblique intersecting cracks, wherein the included angle is within a range of 45-75°, the micro-crack development shale stratum has a crack width within a range of 0.1-100 μm, more preferably 3-60 μm, further preferably 10-40 μm (0.01-0.04 mm), and the permeability response is desirable.

According to a particularly preferred embodiment of the present disclosure, the method for preparing the fiber silica composite microspheres and the drilling fluid for a shale stratum comprises the following steps:

Preparing the Fiber Silica Composite Microspheres:

(1) dissolving span 80 in n-pentane and using the mixed solution as an oil phase in the oil/water double emulsion, dissolving tween 20 in an aqueous hydrochloric acid solution having a concentration of 5-7 mol/L and using the mixed solution as a water phase in the oil/water double emulsion, then blending the oil phase and the water phase with each other to obtain the oil/water double emulsion; placing one of polyester fibers, polyesteramine fibers, polypropylene fibers and polytetrafluoroethylene fibers (the fibers have a length of 5-8 μm and a width of 1-2 μm) into the oil/water double emulsion at room temperature of 23-28° C., and stirring at the speed of 500-600 rpm for 5-8 min to obtain a first mixture; wherein the span is used in an amount of 7-10 g relative to 100 mL of the n-pentane; the tween 20 is used in an amount of 8-12 g relative to 100 mL of the aqueous hydrochloric acid solution; the fibers are used in an amount of 30-70 g, based on the total weight of 100 mL of the n-pentane and 100 mL of the aqueous hydrochloric acid solution.

(2) subsequently adding methyl orthosilicate into the first mixture at the temperature of 24-27° C., stirring at the speed of 500-600 rpm for 30-50 min, and then standing still for 2-4 h to obtain a second mixture; the mass ratio of the silicon source to the fibers is 1:(4-6).

(3) carrying out reduced pressure suction filtration on the second mixture after standing still by using a Buchner funnel under the condition that the pressure is from −0.1 MPa to −0.05 MPa, so as to obtain a solid; washing the obtained solid with ethanol for three times, placing the washed solid in a baking oven and drying at the temperature of 40-50° C. for 3-5 hours to obtain the fiber silica composite microspheres, wherein the hollow silica sphere has an inner diameter of 2.8-3.7 µm and an outer diameter of 3-4 µm;

wherein the hollow silica sphere is contained in an amount of 67-78 wt %, and the fibers are contained in an amount of 22-33 wt %, based on the total weight of the fiber silica composite microsphere; the content of the fibers embedded into an interior of the hollow silica sphere is 7-13 wt %, based on the total weight of the fibers;

Preparing a Plugging Drilling Fluid for a Shale Stratum:

(S1) adding 100 g of clear water into an enamel measuring cup, activating a stirrer, uniformly stirring at a rotating speed of 1,000 rpm, adding 3-6 g of bentonite, 8-12 g of sulfonated phenolic resin, 8-12 g of sulfonated lignite and 30-40 g of barite powder sequentially into the enamel measuring cup, stirring for 20 min, switching off the stirrer to obtain a sulfonated drilling fluid system, and taking out 100 g of the sulfonated drilling fluid system out for later use;

(S2) adding 5-10 g of the prepared fiber silica composite microspheres into the 100 g of sulfonated drilling fluid system, and stirring the mixture for 40 min at the rotating speed of 1,000-1,200 rpm, to obtain the strong plugging drilling fluid suitable for use in the shale.

The present disclosure will be described in detail below with reference to examples.

In the following examples and comparative examples:

The permeability parameter was measured by a plugging effect evaluation method for a low-aperture low-permeability formation disclosed by CN108518216B;

Specifically, the prepared drilling fluid system (a system without a plugging agent is a blank slurry, a system containing the plugging agent is an evaluation slurry) was poured into an aging tank, a hot rolling process was performed at 105° C. for 16 h, the drilling fluid system was taken out and cooled to room temperature, and poured into the GGS42-2 type high-temperature high-pressure filter press (the filtration medium of the filter press was a "simulated core"; preferably, the permeability was $4.78 \times 10^{-4}$ md), the filter loss of the blank slurry was measured at a temperature of 105° C. and a pressure of 3.5 MPa for 30 min, the filtrate was cooled to the room temperature, the slurry in a slurry cup was poured out, distilled water was injected into the slurry cup along an inner wall for 1-2 times, the liquid in the slurry cup was poured out after softly shaking, the virtual mud cake was removed as much as possible, distilled water was then injected into the slurry cup to a scale, the filter loss was measured once for every 5 min at room temperature and under the pressure of 3.5 MPa until expiry of the experimental time of 30 min, the total filter loss was marked as Q, the filter loss volume q of the distilled water in a unit time was q=Q/1800, the unit was $cm^3/s$, and the mud cake permeability calculated according to the formula was denoted as $K_0$; the process was repeated to determine the mud cake permeability $K_1$ of the slurry containing the plugging agent (evaluation slurry), the permeability reduction rate Kr was used for representing the plugging effect, the higher was the permeability reduction rate, the better was the plugging effect of the drilling fluid system.

Buchner funnel was purchased from the manufacture i-Quip with a model number P5764 polyterafluoroethylene Buchner funnel.

The fibers were purchased from Shandong Daitian Engineering Materials Co., Ltd.

Bentonite was purchased from Xinjiang Nonmetallic Minerals Xiazijie Bentonite Co., Ltd.

Methyl orthosilicate was purchased from the Wuhan Huaxiang Kejie Biotechnology Co., Ltd.

Example 1

The example served to illustrate the fiber silica composite microspheres and the drilling fluid for a shale stratum prepared with the method in the present disclosure.

Preparation of the Fiber Silica Composite Microspheres:

(1) 5 g of span 80 was dissolved in 60 ml of n-pentane and the mixed solution was used as an oil phase in the oil/water double emulsion, 4 g of tween 20 was dissolved in an aqueous hydrochloric acid solution having a concentration of 6 mol/L and the mixed solution was used as a water phase in the oil/water double emulsion, the oil phase and the water phase were then blended with each other to obtain the oil/water double emulsion; 50 g of polypropylene fibers (with a length of 8 µm and a width of 2 µm) was placed into the oil/water double emulsion at room temperature of 25° C., and subjected to stirring at the speed of 500 rpm for 5 min to obtain a first mixture;

(2) 10 g of methyl orthosilicate was subsequently added into the first mixture, and subjected to stirring at the speed of 500 rpm for 30 min and then subjected to standing still for 2 h to obtain a second mixture;

(3) the second mixture after standing still was subjected to a reduced pressure suction filtration with a Buchner funnel under the condition that the pressure was −0.1 MPa, a solid was obtained, the obtained solid was washed with ethanol for three times, the washed solid was then placed into a baking oven and subjected to drying at a temperature of 40° C. for 4 hours, the baked solid was taken out to obtain the fiber silica composite microspheres.

Wherein the hollow silica spheres had an inner diameter of 4 µm and an outer diameter of 4.9 µm.

Wherein the hollow silica sphere was contained in an amount of 67 wt %, and the fibers were contained in an amount of 33 wt %, based on the total weight of the fiber silica composite microsphere; the content of the fibers embedded into an interior of the hollow silica sphere was 13 wt %, based on the total weight of the fibers.

Preparation of a Drilling Fluid for a Shale Stratum:

(S1) 100 g of clear water was added into an enamel measuring cup, a stirrer was activated, uniform stirring was performed at a rotating speed of 1,000 rpm; 4 g of bentonite, 10 g of sulfonated phenolic resin, 10 g of sulfonated lignite and 35 g of barite were sequentially added into the enamel measuring cup, the mixture was subjected to stirring for 20 min, the stirrer was powered off to obtain a sulfonated drilling fluid system, 100 g of the sulfonated drilling fluid system was taken out for later use;

(S2) 8 g of the prepared fiber silica composite microspheres was added into the 100 g of sulfonated drilling fluid system, the mixture was subjected to stirring at the rotating speed of 1,000 rpm for 40 min, such that the strong plugging drilling fluid A1 suitable for use in the shale was prepared.

Example 2

The example served to illustrate the fiber silica composite microspheres and the drilling fluid for a shale stratum prepared with the method in the present disclosure.

Preparation of the Fiber Silica Composite Microspheres:

(1) 5 g of span 80 was dissolved in 60 ml of n-pentane and the mixed solution was used as an oil phase in the oil/water double emulsion, 4 g of tween 20 was dissolved in an aqueous hydrochloric acid solution having a concentration of 6 mol/L and the mixed solution was used as a water phase in the oil/water double emulsion, the oil phase and the water phase were then blended with each other to obtain the oil/water double emulsion; 40 g of polyesteramine fibers (with a length of 5 μm and a width of 1 μm) was placed into the oil/water double emulsion at room temperature of 25° C., and subjected to stirring at the speed of 500 rpm for 5 min to obtain a first mixture;

(2) 10 g of methyl orthosilicate was subsequently added into the first mixture, and subjected to stirring at the speed of 500 rpm for 30 min and then subjected to standing still for 2 h to obtain a second mixture;

(3) the second mixture after standing still was subjected to a reduced pressure suction filtration with a Buchner funnel under the condition that the pressure was −0.1 MPa, a solid was obtained, the obtained solid was washed with ethanol for three times, the washed solid was then placed into a baking oven and subjected to drying at a temperature of 40° C. for 4 hours, the baked solid was taken out to obtain the fiber silica composite microspheres.

Wherein the hollow silica spheres had an inner diameter of 4 μm and an outer diameter of 4.7 μm.

Wherein the hollow silica sphere was contained in an amount of 69 wt %, and the fibers were contained in an amount of 31 wt %, based on the total weight of the fiber silica composite microsphere; the content of the fibers embedded into an interior of the hollow silica sphere was 11.5 wt %, based on the total weight of the fibers.

Preparation of a Drilling Fluid for a Shale Stratum:

(S1) 100 g of clear water was added into an enamel measuring cup, a stirrer was activated, uniform stirring was performed at a rotating speed of 1,000 rpm; 3 g of bentonite, 8 g of sulfonated phenolic resin, 8 g of sulfonated lignite and 30 g of barite were sequentially added into the enamel measuring cup, the mixture was subjected to stirring for 20 min, the stirrer was powered off to obtain a sulfonated drilling fluid system, 100 g of the sulfonated drilling fluid system was taken out for later use;

(S2) 5 g of the fiber silica composite microspheres was added into the 100 g of sulfonated drilling fluid system, the mixture was subjected to stirring at the rotating speed of 1,000 rpm for 40 min.

The strong plugging drilling fluid A2 suitable for use in the shale was prepared.

Example 3

The example served to illustrate the fiber silica composite microspheres and the drilling fluid for a shale stratum prepared with the method in the present disclosure.

Preparation of the Fiber Silica Composite Microspheres:

(1) 5 g of span 80 was dissolved in 60 ml of n-pentane and the mixed solution was used as an oil phase in the oil/water double emulsion, 4 g of tween 20 was dissolved in an aqueous hydrochloric acid solution having a concentration of 6 mol/L and the mixed solution was used as a water phase in the oil/water double emulsion, the oil phase and the water phase were then blended with each other to obtain the oil/water double emulsion; 60 g of polyester fibers (with a length of 10 μm and a width of 3 μm) was placed into the oil/water double emulsion at room temperature of 25° C., and subjected to stirring at the speed of 500 rpm for 5 min to obtain a first mixture;

(2) 10 g of methyl orthosilicate was subsequently added into the first mixture, and subjected to stirring at the speed of 500 rpm for 30 min and then subjected to standing still for 2 h to obtain a second mixture;

(3) the second mixture after standing still was subjected to a reduced pressure suction filtration with a Buchner funnel under the condition that the pressure was −0.1 MPa, a solid was obtained, the obtained solid was washed with ethanol for three times, the washed solid was then placed into a baking oven and subjected to drying at a temperature of 40° C. for 4 hours, the baked solid was taken out to obtain the fiber silica composite microspheres.

Wherein the hollow silica sphere had an inner diameter of 4 μm and an outer diameter of 4.5 μm.

Wherein the hollow silica sphere was contained in an amount of 71 wt %, and the fibers were contained in an amount of 29 wt %, based on the total weight of the fiber silica composite microsphere; the content of the fibers embedded into an interior of the hollow silica sphere was 10 wt %, based on the total weight of the fibers.

Preparation of a Drilling Fluid for a Shale Stratum:

(S1) 100 g of clear water was added into an enamel measuring cup, a stirrer was activated, uniform stirring was performed at a rotating speed of 1,000 rpm; 6 g of bentonite, 12 g of sulfonated phenolic resin, 12 g of sulfonated lignite and 40 g of barite were sequentially added into the enamel measuring cup, the mixture was subjected to stirring for 20 min, the stirrer was powered off to obtain a sulfonated drilling fluid system, 100 g of the sulfonated drilling fluid system was taken out for later use;

(S2) 10 g of the fiber silica composite microspheres was added into the 100 g of sulfonated drilling fluid system, the mixture was subjected to stirring at the rotating speed of 1,000 rpm for 40 min.

The strong plugging drilling fluid A3 suitable for use in the shale was prepared.

Example 4

The example served to illustrate the fiber silica composite microspheres and the drilling fluid for a shale stratum prepared with the method in the present disclosure.

The fibrous silica composite microspheres and the drilling fluid for a shale stratum were prepared according to the same method as that in Example, except that:

Preparation of the Fiber Silica Composite Microspheres:

(1) "50 g of polypropylene fibers (with a length of 8 μm and a width of 2 μm)" was replaced with "40 g of fibers (with a length of 5 μm and a width of 1 μm)";

(2) "10 g of methyl orthosilicate" was replaced with "8 g of methyl orthosilicate".

Wherein the hollow silica sphere had an inner diameter of 3 μm and an outer diameter of 3.8 μm.

Wherein the hollow silica sphere was contained in an amount of 73 wt %, and the fibers were contained in an amount of 27 wt %, based on the total weight of the fiber silica composite microsphere; the content of the fibers embedded into an interior of the hollow silica sphere was 8.5 wt %, based on the total weight of the fibers.

Preparation of a Drilling Fluid for a Shale Stratum:

(S1) 100 g of clear water was added into an enamel measuring cup, a stirrer was activated, uniform stirring was performed at a rotating speed of 1,000 rpm; 2 g of bentonite, 6 g of sulfonated phenolic resin, 6 g of sulfonated lignite and 25 g of barite were sequentially added into the enamel measuring cup, the mixture was subjected to stirring for 20 min, the stirrer was powered off to obtain a sulfonated drilling fluid system, 100 g of the sulfonated drilling fluid system was taken out for later use;

(S2) 3 g of the prepared fiber silica composite microspheres was added into the 100 g of sulfonated drilling fluid system, the mixture was subjected to stirring at the rotating speed of 1,000 rpm for 40 min.

The strong plugging drilling fluid A4 suitable for use in the shale was prepared.

Example 5

The example served to illustrate the fiber silica composite microspheres and the drilling fluid for a shale stratum prepared with the method in the present disclosure.

The fibrous silica composite microspheres and the drilling fluid for a shale stratum were prepared according to the same method as that in Example 1, except that:

Preparation of the Fiber Silica Composite Microspheres:

(1) "50 g of polypropylene fibers (with a length of 8 μm and a width of 2 μm)" was replaced with "70 g of fibers (with a length of 12 μm and a width of 3 μm";

(2) "10 g of methyl orthosilicate" was replaced with "12 g of methyl orthosilicate".

Wherein the hollow silica sphere had an inner diameter of 3 μm and an outer diameter of 3.4 μm.

Wherein the hollow silica sphere was contained in an amount of 75 wt %, and the fibers were contained in an amount of 25 wt %, based on the total weight of the fiber silica composite microsphere; the content of the fibers embedded into an interior of the hollow silica sphere was 7 wt %, based on the total weight of the fibers.

Preparation of a Drilling Fluid for a Shale Stratum:

(S1) 100 g of clear water was added into an enamel measuring cup, a stirrer was activated, uniform stirring was performed at a rotating speed of 1,000 rpm; 7 g of bentonite, 14 g of sulfonated phenolic resin, 14 g of sulfonated lignite and 45 g of barite were sequentially added into the enamel measuring cup, the mixture was subjected to stirring for 20 min, the stirrer was powered off to obtain a sulfonated drilling fluid system, 100 g of the sulfonated drilling fluid system was taken out for later use;

(S2) 15 g of the prepared fiber silica composite microspheres was added into the 100 g of sulfonated drilling fluid system, the mixture was subjected to stirring at the rotating speed of 1,000 rpm for 40 min.

The strong plugging drilling fluid A5 suitable for use in the shale was prepared.

Comparative Example 1

The fibrous silica composite microspheres and the drilling fluid for a shale stratum were prepared according to the same method as that in Example 1, except that:

The fiber silica composite microspheres were not prepared according to the method of "Preparation of the fiber silica composite microspheres" in Example, but the same weight of "fibers" was used for replacing the "fiber silica composite microspheres", that is, 8 g of fibers were added into 100 g of the sulfonated drilling fluid system in the step (S2).

The drilling fluid D1 was prepared.

Comparative Example 2

The fibrous silica composite microspheres and the drilling fluid for a shale stratum were prepared according to the same method as that in Example 1, except that:

The fiber silica composite microspheres were not prepared according to the method of "Preparation of the fiber silica composite microspheres" in Example 1, but the same weight of "hollow silica spheres" was used for replacing the "fiber silica composite microspheres", that is, 8 g of hollow silica spheres were added into 100 g of the sulfonated drilling fluid system in the step (S2).

The drilling fluid D2 was prepared.

Comparative Example 3

The fibrous silica composite microspheres and the drilling fluid for a shale stratum were prepared according to the same method as that in Example 1, except that:

During the preparation of a drilling fluid for a shale stratum, 4 g of fibers and 4 g of hollow silica spheres were added into 100 g of the sulfonated drilling fluid system in the step (S2).

The drilling fluid D3 was prepared.

Comparative Example 4

The fibrous silica composite microspheres and the drilling fluid for a shale stratum were prepared according to the same method as that in Example 1, except that:

During the preparation of the fiber silica composite microspheres, "50 g of fibers (with a length of 8 μm and a width of 2 μm)" was replaced with "50 g of fibers (with a length of 20 μm and a width of 2 μm)" in the step (1).

Wherein the hollow silica sphere was contained in an amount of 67 wt %, and the fibers were contained in an amount of 33 wt %, based on the total weight of the fiber silica composite microsphere; the content of the fibers embedded into an interior of the hollow silica sphere was 1.5 wt %, based on the total weight of the fibers.

The drilling fluid D4 was prepared.

Comparative Example 5

The fibrous silica composite microspheres and the drilling fluid for a shale stratum were prepared according to the same method as that in Example 1, except that:

During the preparation of the fiber silica composite microspheres, "50 g of fibers (with a length of 8 μm and a width of 2 μm)" was replaced with "50 g of fibers (with a length of 2 μm and a width of 2 μm)" in the step (1).

Wherein the hollow silica sphere was contained in an amount of 67 wt %, and the fibers were contained in an amount of 33 wt %, based on the total weight of the fiber silica composite microsphere; the content of the fibers embedded into an interior of the hollow silica sphere was 0.5 wt %, based on the total weight of the fibers.

The drilling fluid D5 was prepared.

Comparative Example 6

The fibrous silica composite microspheres and the drilling fluid for a shale stratum were prepared according to the same method as that in Example 1, except that:

During the preparation of the fiber silica composite microspheres, "50 g of fibers" was replaced with "10 g of fibers" in the step (1).

Wherein the hollow silica sphere was contained in an amount of 86 wt %, and the fibers were contained in an amount of 14 wt %, based on the total weight of the fiber silica composite microsphere; the content of the fibers embedded into an interior of the hollow silica sphere was 1.5 wt %, based on the total weight of the fibers.

The drilling fluid D6 was prepared.

Comparative Example 7

The fibrous silica composite microspheres and the drilling fluid for a shale stratum were prepared according to the same method as that in Example 1, except that:

During the preparation of a drilling fluid for a shale stratum, "8 g of the prepared fibrous silica composite microspheres", instead of "2 g of the prepared fibrous silica composite microspheres", was added into 100 g of the sulfonated drilling fluid system in the step (S2).

The drilling fluid D7 was prepared.

Comparative Example 8

The fibrous silica composite microspheres and the drilling fluid for a shale stratum were prepared according to the same method as that in Example 1, except that:

During the preparation of strong plugging drilling fluid suitable for shale stratum, 30 g of fiber silica composite microspheres were added into 100 g of sulfonated drilling fluid system, the mixture was subjected to stirring at the rotating speed of 1,000 rpm for 40 minutes.

The drilling fluid D8 was prepared.

Test Example

The drilling fluids prepared in the examples 1-5 and comparative examples 1-8 were subjected to the plugging evaluation experiments, the experimental method was performed according to the plugging effect evaluation method for low-aperture low-permeability formation disclosed in CN108518216B, and the experimental results were shown in Table 1 for evaluation of the plugging performance of the drilling fluids.

TABLE 1

| Experimental groups | $K/10^{-4}$md | | |
| --- | --- | --- | --- |
| | $K_0$ | $K_1$ | $K_r$/% |
| A1 | 4.59 | 0.24 | 94.77 |
| A2 | 4.59 | 0.27 | 94.12 |
| A3 | 4.59 | 0.31 | 93.25 |
| A4 | 4.59 | 0.38 | 91.72 |
| A5 | 4.59 | 0.41 | 91.06 |
| D1 | 4.59 | 0.81 | 82.35 |
| D2 | 4.59 | 1.24 | 72.98 |
| D3 | 4.59 | 1.02 | 77.78 |
| D4 | 4.59 | 1.69 | 63.18 |
| D5 | 4.59 | 1.09 | 76.25 |
| D6 | 4.59 | 1.15 | 74.95 |
| D7 | 4.59 | 2.25 | 50.98 |
| D8 | 4.59 | 1.24 | 72.98 |

Note:
$K_0$ represents the mud cake permeability of the standard slurry, the unit is mD;
$K_1$ represents the mud cake permeability after plugging with the system to be evaluated, the unit is mD;
kr represents the permeability reduction rate, the unit is %.

The data of Table 1 demonstrates the following evidences:

The drilling fluid A1-A5 suitable for a shale stratum prepared by the preparation method provided by the present disclosure have shown extremely strong plugging capability, and the permeability reduction rate can reach 90% or more.

In regard to the drilling fluid D1, only fibers are used as the plugging material, but the fibers pertain to a softer material without hardness, the fibers may easily move in the micro-cracks, such that the plugging effect is poor.

In regard to the drilling fluid D2, which only uses the hollow silica spheres as the plugging material, and the hollow silica spheres can fill in the micro-cracks and fulfill the purpose of plugging, however, because there is not connection between the hollow silica spheres, the filled hollow silica spheres are prone to move, thus the plugging effect becomes worse.

In regard to the drilling fluid D3, only fibers and hollow silica spheres are used as the plugging material, instead of using the fiber silica composite microspheres, that is, it cannot be ensured that the fibers are embedded into the hollow spheres, although the fibers are intertwined to form a plurality of spaces to define the positions of part of the hollow silica spheres, a part of the hollow silica spheres still move under the impact of liquid, such that the blocking effect becomes worse.

In regard to the drilling fluid D4, given that the fibers have an excessive length, the fiber silica composite microspheres are aggregated due to intertwining of the fibers before entering into the micro-crack, and the aggregated material cannot enter into the micro-crack due to an increased particle size, thereby causing the poor plugging effect.

With respect to the drilling fluid D5, the fiber length is too small, so that the interconnection relationship of the fiber silica composite microspheres in the micro-cracks becomes weak, and the stability of the fiber silica composite microspheres in the micro-cracks is not high, and the fiber silica composite microspheres are prone to move, thereby causing deterioration of the plugging performance.

With respect to the drilling fluid D6, because the added amount of fibers is too small during a process of preparing the fiber silica composite microspheres, a part of the hollow silica spheres do not contain fibers, that is, it only plays a role of the common hollow silica spheres, thus the plugging effect is not good enough.

With respect to the drilling fluid D7, the added amount of the fiber silica composite microspheres is excessively low, thus the plugging effect is undesirable.

With respect to the drilling fluid D8, even if the added amount of the fiber silica composite microspheres exceeds the addition amount range defined by the present disclosure, the permeability reduction rate is not obviously improved; in addition, the addition of too many fiber silica composite microspheres may influence the rheological property of the drilling fluid per se, the rheological property of the drilling fluid is deteriorated, as a result, the comprehensive performance of the drilling fluid is desirable when the addition amount of the fiber silica composite microspheres is within the addition amount range defined by the present disclosure.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A fiber silica composite microsphere for a shale stratum comprising a hollow silica sphere and fibers, wherein the fibers are partially coated on an outer surface of the hollow silica sphere and partially embedded into an interior of the hollow silica sphere, wherein the hollow silica sphere has an inner diameter of 0.8-4.7 µm and an outer diameter of 1-5 µm; the fibers have a length of 5-10 µm and a width of 1-3 µm.

2. The fiber silica composite microsphere of claim 1, wherein the hollow silica sphere has an inner diameter of 2.8-3.7 µm and an outer diameter of 3-4 µm; the fibers have a length of 5-8 µm and a width of 1-2 µm.

3. The fiber silica composite microspheres of claim 1, wherein the fibers are one or more selected from the group consisting of polyester fibers, polyesteramine fibers, polypropylene fibers, and polytetrafluoroethylene fibers.

4. The fiber silica composite microsphere of claim 1, wherein the hollow silica sphere is contained in an amount of 62-83 wt %, and the fibers are contained in an amount of 17-38 wt %, based on the total weight of the fiber silica composite microsphere.

5. The fiber silica composite microsphere of claim 1, wherein the content of the fibers embedded into an interior of the hollow silica sphere is 4-16 wt %, based on the total weight of the fibers.

6. A drilling fluid for a shale stratum comprising the fiber silica composite microsphere for a shale stratum of claim 1.

7. The drilling fluid of claim 6, wherein the fiber silica composite microsphere is contained in an amount of 3-15 parts by weight relative to 100 parts by weight of the drilling fluid.

8. The drilling fluid of claim 6, wherein the drilling fluid further comprises water, bentonite, sulfonated phenolic resin, sulfonated lignite and a weighting agent, and the content of the bentonite is 3-6 parts by weight, the content of the sulfonated phenolic resin is 8-12 parts by weight, the content of the sulfonated lignite is 8-12 parts by weight, and the content of the weighting agent is 30-40 parts by weight, based on 100 parts by weight of water.

9. The drilling fluid of claim 6, wherein a method for preparing the drilling fluid comprises the following steps:
 (S1) contacting water with bentonite, sulfonated phenolic resin, sulfonated lignite and a weighting agent sequentially under the stirring condition to obtain a sulfonated drilling fluid system;
 (S2) contacting the sulfonated drilling fluid system with the fiber silica composite microsphere of claim 1, to obtain the drilling fluid for a shale stratum.

* * * * *